Feb. 4, 1958 E. L. FRENCH 2,822,512
RECTIFIER ASSEMBLIES
Filed March 28, 1956

INVENTOR.
Eric Lionel French.
BY W. L. Stout.
HIS ATTORNEY

2,822,512
RECTIFIER ASSEMBLIES

Eric Lionel French, London, England, assignor to Westinghouse Brake and Signal Company, Limited, London, England Application March 28, 1956, Serial No. 574,527

Claims priority, application Great Britain May 17, 1955

9 Claims. (Cl. 317—234)

My invention relates to dry contact rectifier assemblies, and particularly to encapsulated rectifier assemblies wherein the rectifier elements are protected from the effects of moisture.

In encapsulated rectifier assemblies wherein wires are used to provide connections between the rectifier elements and the external circuit, difficulty has been encountered in preventing the entry of moisture along the surface of the wires even though the connecting wires are brought out through seals formed of water-repellent plastic material. Another difficulty encountered in former rectifier assemblies while soldering the necessary circuit connections is the transmittal of the soldering heat to the rectifier elements of the assembly, the soldering heat having an adverse effect on the electrical characteristics of the elements.

It is therefore an object of my invention to enclose a dry contact rectifier element, or elements, in a shell having sealing means which will prevent the entry of moisture along the surface of the connecting wires, the sealing means comprising an insulating material of high thermal conductivity and high specific heat to prevent heat transmittal along the wires during soldering operations.

According to the invention, a dry contact rectifier element is enclosed in a cylindrical metal shell or case, the shell being closed at one end by a metal disc. A wire, having a contact member secured to its inner end for engaging the rectifier element electrode, projects out through an opening in the end disc, the opening being sealed by means of a fillet of solder or the like. The other connecting wire of the assembly is also provided with a contact member secured to its end, the wire projecting out of the case through a pad of resilient material held under pressure and a plug of resilient material also held under pressure by a disc or washer in the open end of the cylindrical shell by swaging over the edges of the shell.

Other objects and advantages of my invention will become apparent from the following description taken in connection with the accompanying drawings.

Figure 1:
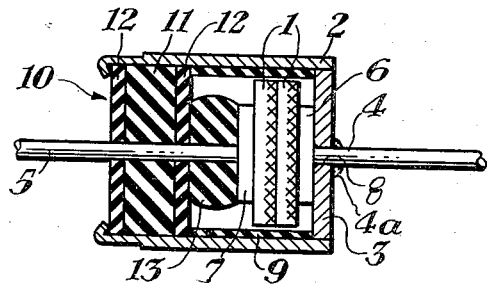
Figure 2:
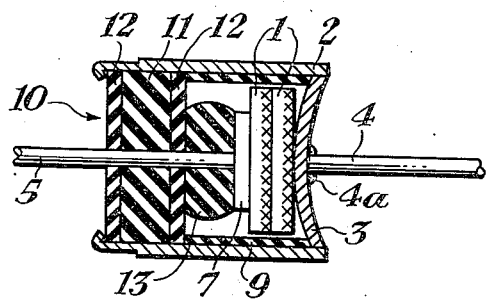

In the accompanying drawings wherein I have illustrated two embodiments of my invention and wherein similar reference characters designate similar parts in the two views, Fig. 1 is a vertical cross-section of a rectifier assembly embodying my invention, while Fig. 2 is a similar view of a second embodiment of the invention.

Referring now in detail to the drawings, a stack of rectifier elements 1 is enclosed within a cylindrical case 2, preferably of copper; the case being open at one end and closed at the other by means of a disc 3. The disc and cylinder may be formed from a sheet of metal by pressing or, alternatively, they may be soldered together. Contact is made with the ends of the stack 1 by means of two connector wires 4 and 5 each provided with a disc-shaped head 6 and 7, respectively, which abuts against the corresponding end of the stack. The wire 4 projects axially through a hole 8 in the disc 3 and the entry of moisture through that hole is prevented by sealing the wire to the disc by means of a fillet of solder 4a. The other wire 5 projects axially through the open end of the cylinder. The edges of the rectifier elements are insulated from the cylinder by means of a cylindrical liner 9 of insulating material and preferably formed of "Perspex," the liner 9 abutting at one end against the disc 3 and at the other end against a plug designated by the reference character 10, the plug forming a closure for the open end of the cylinder.

The plug 10 consists of a resilient washer 11 preferably of silicone rubber, compressed between an inner and an outer stiff washer 12 formed of laminated phenolic insulating material. The inner stiff washer abuts against the end of the liner 9 remote from the disc and the plug is held in place by swaging the open end of the copper cylinder over the edge of the outer stiff washer, the resilient washer being compressed by forcing the outer stiff washer toward the inner stiff washer during this swaging process. Preferably, the end of the cylinder which is swaged is formed of thinner metal than the rest of the cylinder. The external and internal diameter of the resilient washer 11 are such that, when the washer is not compressed, it fits closely within the cylinder 2 and upon the wire 5. Axial compression of the washer causes it to swell in a direction transverse to the axis of the cylinder against the internal surface of the cylinder and the surface of the wire. The use of stiff washers on both sides of the resilient washer insures that the resilient washer is not distorted from its planar shape and it also insures that that portion of connecting wire which lies between the two stiff washers is free from serious distortion.

The stack 1 is maintained under compression by means of a pressure pad 13 preferably of silicone rubber, which is threaded before assembly upon the connecting wire 5. The pad 13 is maintained, after assembly, in a state of compression between the head 7 of the connecting wire 5 and the plug 10.

The use of silicone rubber has the advantage that its high thermal conductivity and high specific heat prevent heat being transmitted along the connecting wires to the rectifier elements while the assembly is being soldered to an external circuit.

Instead of bringing the connecting wire 4 out through a hole in the disc which closes one end of the cylinder, the hole 8 may be omitted and the wire soldered to the external surface of the cylinder, one end of the stack then abutting against the closed end of the cylinder. In order to reduce the risk of contact or leakage between the edge of the element adjacent the closed end and the inner surface of the cylinder, the disc 3 may be dished inward, as illustrated in Fig. 2, so as to locate that element within the liner at a safe distance from the end thereof.

The outer stiff washer may be replaced by a substantially rigid member molded in plastic material and the molding may be formed with a shoulder on its cylindrical surface around which the end of the cylinder may be swaged. Alternatively, the stiff washers may be formed of metal if the magnitudes of the internal and/or external diameters are so chosen as to eliminate the risk of short-circuiting the stack.

It will be apparent that a dry contact rectifier assembly embodying my invention may be advantageously used under humid ambient conditions, as, for example, in the tropics, the seals provided for the connecting wires being such that no moisture may enter the case along the surface of the wires. The rectifier assemblies embodying my invention have the further advantage of being provided with seals for dissipating the heat transmitted by the connecting wire during soldering operations, the disc-shaped contact elements aiding in the heat dissipation. A further advantage of a rectifier assembly embodying my invention is that the assembly comprises few and simple parts which lend themselves readily to mass production methods.

Although I have herein illustrated and described two embodiments of my rectifier assembly, it is understood that various changes and modifications may be made therein within the scope of the appended claims without departing from the spirit and scope of my invention.

Having thus described my invention, what I claim is:

1. A rectifier assembly comprising a metallic case having a closed end, a stack of rectifier elements in said case, means for insulating said stack from said case, means for maintaining the rectifier elements under pressure, a plug for the open end of said case including a resilient washer, means for holding said washer under compression to seal the open end of the case, and means for making circuit connections through said plug to said rectifier stack.

2. A rectifier assembly comprising a metallic case having a closed end, a stack of rectifier elements in said case, means for insulating said stack from said case, means for maintaining the rectifier elements under pressure, a plug for the open end of the case including a resilient washer of high thermal conductivity, means for holding said washer under compression to seal the open end of the case, and means for making circuit connections through said plug and through said closed end to said rectifier stack.

3. A rectifier stack comprising a metallic case having a closed dished end, a stack of rectifier elements in said case, an electrode of the end rectifier element abutting the dished end of the case, means for insulating the rectifier elements from the sides of said case, means for maintaining the rectifier elements under pressure, a plug for the open end of the case including a resilient washer, means for holding said washer under compression to seal the open end of the case, and means for making circuit connections through said plug to said rectifier stack and to the dished end of the case.

4. A rectifier stack comprising a metallic case having a closed dished end, a stack of rectifier elements in said case, an electrode of the end rectifier element abutting the dished end of the case, means for insulating the rectifier elements from the sides of said case, means for maintaining the rectifier elements under pressure, a plug for the open end of the case including a resilient washer of high thermal conductivity, means for holding said washer under compression to seal the open end of the case, and means for making circuit connections through said plug to said rectifier stack and to the dished end of the case.

5. A rectifier assembly comprising a case having one end closed and the other open, the closed end being provided with an opening; a stack of rectifier elements in said case, a first contact element in said case abutting the closed end of the case and one end of the rectifier stack, a first conductor connected to said first contact element and passing out through the opening in the closed end of the case, means for sealing the opening in the closed end of the case, a second contact element abutting the other end of the rectifier stack, a second conductor connected to said second contact element and passing out through the open end of the case, a resilient pad threaded over said second conductor, a resilient plug sealing the open end of the case including a resilient washer threaded over said second conductor and two relatively stiff washers of insulating material on both sides of said resilient washer, and means for holding said resilient plug in the open end of the case under compression to seal said case and conductor entrant in the washer and to hold said pad under compression.

6. A rectifier assembly comprising a metallic case having one end closed and the other open, the closed end being provided with an opening; a stack of rectifier elements in said case, a liner of insulating material insulating said rectifier elements from said case, a first contact element in said case abutting the closed end of the case and one end of the rectifier stack, a first conductor connected to said first contact element and passing out through the opening in the closed end of the case, means for sealing the opening in the closed end of the case, a second contact element abutting the other end of the rectifier stack, a second conductor connected to said second contact element and passing out through the open end of the case, a resilient pad threaded over said second conductor, a resilient plug sealing the open end of the case including a resilient washer threaded over said second conductor and two relatively stiff washers of insulating material on both sides of said resilient washer, and means for holding said resilient plug in the open end of the case under compression to seal said case and conductor entrant in the washer and to hold said pad under compression.

7. A rectifier assembly comprising, a metallic case having a closed end and an open end, a stack of rectifier elements in said case, the rectifier element at one end of the stack abutting the end of the case, a liner of insulating material insulating the rectifier elements from the sides of the stack, a contact element abutting the rectifier element at the other end of the stack, a conductor secured to the contact element and passing out through the open end of the case, a resilient pad threaded over said conductor, a resilient plug for the open end of the case including a resilient washer and two relatively stiff washers of insulating material on both sides of said washer threaded over said conductor, means for holding said resilient plug in the open end of the case under compression to seal said case and conductor entrant in said washer and to hold said pad under compression; and means for making a circuit connection to the end of said case.

8. A rectifier assembly comprising, a metallic case having a closed dished end and an open end, a stack of rectifier elements in said case, the rectifier element at one end of the stack abutting the dished end of the case, a liner of insulating material insulating the rectifier elements from the sides of the stack, a contact element abutting the rectifier element at the other end of the stack, a conductor secured to the contact element and passing out through the open end of the case, a resilient pad threaded over said conductor, a resilient plug for the open end of the case including a resilient washer of high thermal conductivity and two relatively stiff washers of insulating material on both sides of said washer threaded over said conductor, means for holding said resilient plug in the open end of the case under compression to seal said case and conductor entrant in said washer and to hold said pad under compression; and means for making a circuit connection to the dished end of said case.

9. A rectifier assembly comprising, a metallic case having a closed dished end and an open end, a stack of rectifier elements in said case, the rectifier element at one end of the stack abutting the dished end of the case, a liner of insulating material insulating the rectifier elements from the sides of the stack, a contact element abutting the rectifier element at the other end of the stack, a conductor secured to the contact element and passing out through the open end of the case, a resilient pad threaded over said conductor, a resilient plug for the open end of the case including a resilient washer and two relatively stiff washers of insulating material on both sides of said washer threaded over said conductor, means for holding said resilient plug in the open end of the case under compression to seal said case and conductor entrant in said washer and to hold said pad under compression; and means for making a circuit connection to the dished end of said case.

References Cited in the file of this patent

UNITED STATES PATENTS

| | | |
|---|---|---|
| 2,498,666 | Escoffery et al. | Feb. 28, 1950 |
| 2,545,863 | Sell et al. | Mar. 20, 1951 |
| 2,712,619 | Zetwo | July 5, 1955 |
| 2,737,618 | Eisler | Mar. 6, 1956 |

OTHER REFERENCES

Abstract of Serial No. 694,128, Hein et al., November 8, 1949.